United States Patent
Kang et al.

(10) Patent No.: US 7,404,432 B2
(45) Date of Patent: Jul. 29, 2008

(54) PLATE-SHAPED HEATING PANEL IN WHICH CONNECTING MEMBERS ARE FASTENED BY RESIN

(75) Inventors: Se-Chang Kang, Cheongju-si (KR);
Jang-Seok Park, Cheongju-si (KR);
Kyoung-Myoung Chae, Daejeon (KR);
Min-Soo Han, Kimpo-si (KR);
Seong-Chan Park, Cheongju-si (KR);
Sung-Seock Hwang, Cheongju-si (KR)

(73) Assignee: LG Chem, Ltd. (KR)

( * ) Notice: Subject to any disclaimer, the term of this patent is extended or adjusted under 35 U.S.C. 154(b) by 619 days.

(21) Appl. No.: 10/995,671

(22) Filed: Nov. 23, 2004

(65) Prior Publication Data
US 2006/0000578 A1 Jan. 5, 2006

(30) Foreign Application Priority Data
Jun. 30, 2004 (KR) .................. 20-2004-0018474 U

(51) Int. Cl.
*F28F 3/14* (2006.01)
(52) U.S. Cl. .............................. 165/56; 165/53; 165/170
(58) Field of Classification Search ................ 165/46, 165/53, 56, 165, 170
See application file for complete search history.

(56) References Cited

U.S. PATENT DOCUMENTS

| | | | | |
|---|---|---|---|---|
| 4,524,757 A | * | 6/1985 | Buckley | 165/46 |
| 4,955,435 A | * | 9/1990 | Shuster et al. | 165/170 |
| 5,080,166 A | | 1/1992 | Haugeneder | 165/56 |
| 5,125,238 A | * | 6/1992 | Ragan et al. | 165/46 |
| 6,013,098 A | * | 1/2000 | Kappel et al. | 165/46 |
| 7,027,725 B2 | * | 4/2006 | Kim et al. | 165/165 |
| 7,143,823 B2 | * | 12/2006 | Kang et al. | 165/170 |

FOREIGN PATENT DOCUMENTS
KR 2002-0095733 12/2002

* cited by examiner

*Primary Examiner*—Ljiljana (Lil) V Ciric
(74) *Attorney, Agent, or Firm*—Cantor Colburn LLP

(57) ABSTRACT

Disclosed is a plate-shaped heating panel having connecting members fastened to each other by means of resin. The heating panel comprises upper and lower plates integrally formed to face each other so as to form an inner fluid pathway in which heating water flows, a plurality of connecting members, each symmetrically extending from the upper and lower plates toward the lower and upper plates, respectively, and connecting the upper and lower plates to each other, the plurality of connecting members forming the inner fluid pathway at an inside surface of the plate, and two fluid communication portions for supplying and discharging the heating water, wherein one or more connecting members adjacent to the fluid communication portions are punctured to form holes. The holes are filled with a melted plastic resin, and the integrated plastic resin is integrated with the connecting members by pressing.

2 Claims, 4 Drawing Sheets

PLATE-SHAPED HEATING PANEL IN WHICH CONNECTING MEMBERS ARE FASTENED BY RESIN

BACKGROUND OF THE INVENTION

1. Field of the Invention

The present invention relates to a plate-shaped heating panel with an inner fluid pathway formed therein, and more particularly to a heating panel, which has connecting members fastened to each other by means of a resin, thereby enhancing pressure resistance.

2. Description of the Related Art

Generally, a heating system, having been applied to residential buildings, such as houses, villas, and apartments, employs a structure involving a wet heating process, in which a pipe is laid under a flooring material of a room in a building and supplied with heating fluid, such as heating water, thereby heating the room of the building. However, such a wet type heating system has a lower heating efficiency, resulting in large thermal losses, and requires lengthy concrete curing, resulting in extended construction time. Furthermore, upon leakage of water from the pipe, a mortar layer of the heating system must be broken for repair, thereby impeding easy overhaul while increasing overhaul costs.

In order to solve the problems of the conventional wet heating system as described above, a dry heating panel, made of concrete, a synthetic resin or yellow clay, was developed. The dry heating panel is embedded with a pipe for carrying heating water therein or provided with grooves or fixing members for inserting the pipe for carrying heating water. The dry heating panel is an assembly heating panel, and has advantageous effects in that the construction of the heating system may be completed by simply assembling previously produced pieces of the dry heating panel, thereby reducing the construction time, and simplifying maintenance and overhaul operations thereof. However, the dry heating panel has problems in that, since it adopts a line heating structure in which radiation heat is mainly concentrated where the pipe for carrying heating water is located, generating a severe temperature variation in the heating system, the dry heating panel is ineffective in view of heating efficiency, and in that, since the pipe itself is made of metal or a synthetic resin, it is expensive, resulting in increased construction costs. Furthermore, thermal loss may occur due to piping, and dewing phenomenon may occur on the surface of the pipe, thereby wetting the panel.

In order to solve the problems of the conventional dry heating panel described above, as disclosed in U.S. Pat. No. 5,080,166 and Korean patent application Laid-open publication No. 2002-95733, a plate-shaped heating panel provided with an inner fluid pathway for allowing the heating water to flow therethrough was developed. Compared with the dry type heating system adopting the line heating structure, the plate-shaped heating panel having the inner fluid pathway therein adopts a plane heating structure in which the heating water flows not in a local area but in an overall area of panels, so that it provides very high heating efficiency, resulting in reduction of fuel expenses, and so that the pipe is not required for the structure of the plate-shaped heating panel, thereby eliminating a complicated piping work and reducing the expenses for piping. Additionally, the plate-shaped heating panel is not subjected to the thermal loss and the dewing phenomenon, which usually occurs on the surface of the pipe in the structure of the dry heating panel, and allows a weight of the panel to be reduced. Furthermore, the plate-shaped heating panel is very easy to construct and repair.

Conventionally, the plate-shaped heating panel with an inner fluid pathway formed therein was formed by way of blow molding, as also known as hollow molding. The blow molding is a molding method which forms a hollow product by blowing air into a separating mold, in which molten thermoplastic forming material is inserted and then softened with heat.

Conventionally, upon manufacturing the plate-shaped heating panel by way of the blow molding, when a thermoplastic resin is compressed by a molding plate after the resin is pushed in an extrusion die, hot air is blown into the resin in a cylindrical shape. At this time, since the resin has a temperature decreased below the melting point of the resin, bonding between the resin parts is incomplete. Accordingly, the inner fluid pathway has a hexagonal shape with upper and lower portions parallel to each other, and is formed at right and left sides thereof with notches (each of which is an edge submerging a small angle between symmetrical lines).

In the case where heating fluid of a high pressure flows through the inner fluid pathway of the heating panel, a stress is concentrated on the notches of the inner fluid pathway, causing an initial crack around the notches. The crack is advance along the boundary of plates where the resin is compressed by the mold, resulting in a phenomenon wherein upper and lower plates are separated from each other.

SUMMARY OF THE INVENTION

Therefore, the present invention has been made in view of the above problems, and it is an object of the present invention to provide a plate-shaped heating panel, designed to cause cracks initially formed in the panel to advance along a bonded plane of upper and lower plates, changing a direction in which the cracks are advanced, and enhancing a bonding strength of the bonded plane in a changed direction, thereby enhancing pressure resistance of the panel.

In accordance with an aspect of the present invention, the above and other objects can be accomplished by the provision of a heating panel, comprising upper and lower plates integrally formed to face each other so as to form an inner fluid pathway in which heating water flows; a plurality of connecting members, each symmetrically extending from the upper and lower plates toward the lower and upper plates, respectively, and connecting the upper and lower plates to each other; the inner fluid pathway formed at an inside of the plate by means of the plurality of connecting members; and two fluid communication portions for supplying and discharging the heating water, wherein one or more connecting members adjacent to the fluid communication portions are punctured to form holes such that the holes are filled with a melted plastic resin, and the melted plastic resin is integrated with the connecting members by pressing.

The plastic resin may be polypropylene resin or fiber reinforced plastic.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Preferred embodiments of the present invention will be described in detail with reference to the drawings.

Figure 1:
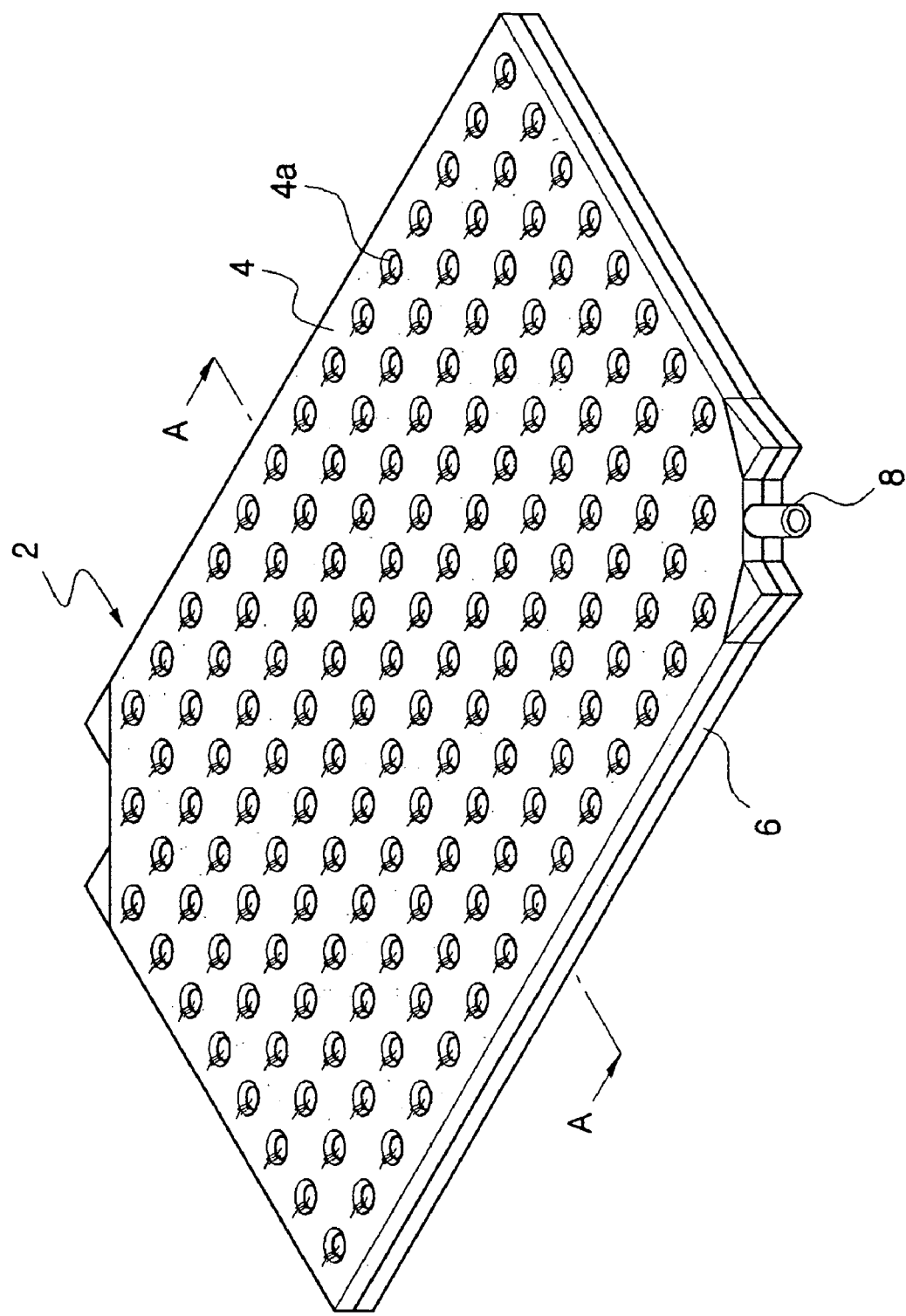
FIG. 1 is a perspective view illustrating a plate-shaped heating panel having an inner pathway formed therein according to the present invention.
Figure 2:
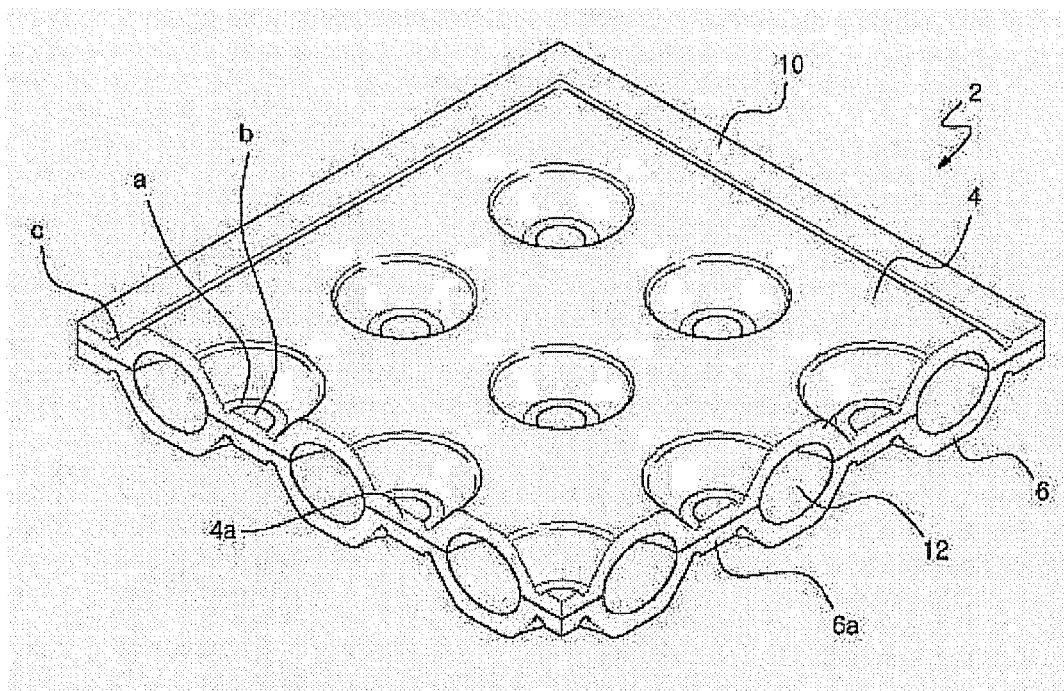
FIG. 2 is an enlarged cut-away perspective view of FIG. 1.

FIG. 1 is a perspective view illustrating a plate-shaped heating panel according to one embodiment of the present invention, and FIG. 2 is an enlarged cut-away view of FIG. 1. A heating panel 2 of the present invention comprises upper and lower plates 4 and 6 integrally formed to face each other, forming an inner fluid pathway 12 in which heating fluid flows. In order to allow easy manufacturing and forming, the heating panel 2 is made of a thermoplastic material, and has a flat plate shape in order to maximize surface contact with the floor (it is also applicable to a wall or a ceiling) of a room such that the heating fluid may contact the floor of the room over a larger area.

As shown in FIG. 1, the heating panel 2 has a rectangular structure with a pair of long sides and a pair of short sides. However, for easier continuous arrangement of the heating panels in construction of the heating system, the heating panel may have other polygonal structures, such as a hexagonal shape or an octagonal shape.

The heating panel 2 is integrally formed with two fluid communication portions 8 for supplying and discharging the heating water at two opposite corners of the heating panel 2 in a diagonal direction. The fluid communication portions 8 are fastened to other fluid communication portions of other heating panels by means of additional connecting members, respectively.

Fastening between the heating panels 2 can be performed by connecting panel-connecting portions 10 formed at respective sides of each of the heating panels 2 using additional fastening members.

Figure 3:
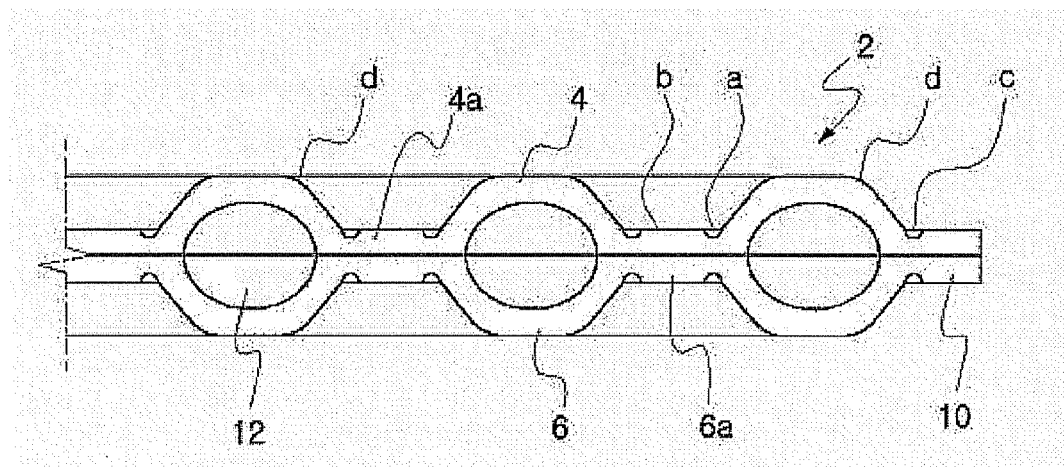
FIG. 3 is a cross-sectional view taken along line A-A of FIG. 1.

FIG. 3 is a cross sectional view taken along line A-A of FIG. 1, in which the upper and lower plates 4 and 6 are provided with a plurality of connecting members 4a and 6a and an inner fluid pathway 12. Among the connecting members 4a and 6a consisting of upper connecting members 4a and lower connecting members 6a, each of the upper connecting members 4a extends from the upper plate 4 to the lower plate 6 and each of the lower connecting members 6a extends from the lower plate 6 to the upper plate 4 such that the upper and lower connecting members 4a and 6a extend symmetrically, connecting the upper and lower plates.

The connecting members 4a and 6a serve not only to prevent the upper and lower plates 4 and 6 from being deformed due to an external force while supporting the upper and lower plates 4 and 6, but also to define the inner fluid pathway for allowing the heating water to flow therein while imposing resistance on flow of the heating water in order that the heating water may be uniformly distributed in the panel without being concentrated or retarded at a specific portion of the heating panel 2.

As shown in FIG. 3, the upper and lower connecting members 4a and 6a preferably have a circular cross-section. Alternatively, the upper and lower connecting members 4a and 6a may have other polygonal cross-sections, such as a rectangular cross-section, a hexagonal cross-section, and the like. The upper and lower connecting members 4a and 6a having a predetermined diameter are arranged in a predetermined pattern, and spaced a predetermined distance from adjoining upper and lower connecting members 4a and 6a, respectively. The upper and lower connecting members 4a and 6a have cylindrical shaped negative angle structures, extending from the upper and lower plate 4 and 6, and having a diameter gradually decreasing from the upper and lower plate 4 and 6 to the bottom plane located at the center of the connecting members 4a and 6a.

Although the heating panel 2 of the present invention is integrally formed with the upper and lower plates 4 and 6, for convenience of description, the heating panel 2 is divided into the upper and lower plates 4 and 6, and the upper and lower connecting members 4a and 6a, centering on a central axis of the cross section in the horizontal direction. Furthermore, as the connecting members 4a and 6a extend from the upper and lower plates 4 and 6, respectively, the boundary between the upper and lower connecting members 4a and 6a will be defined from upper and lower portions d and d' (not shown in the figures), where the upper and lower connecting members 4a and 6a start to extend from the upper and lower plates 4 and 6, to the bottom plane b of the upper and lower connecting members 4a and 6a, where the upper and lower connecting members 4a and 6a contact each other, connecting the upper and lower plates 4 and 6.

According to one embodiment of the present invention, in order to impart upper and lower portions of the inner fluid pathway 12 with a circular or elliptical shape, the upper and lower portions d and d', where the upper and lower connecting members 4a and 6a start to extend from the upper and lower plates 4 and 6, may be rounded. Furthermore, the upper and lower connecting members 4a and 6a may be formed with a groove structure, in which the upper and lower connecting members 4a and 6a are depressed at the circular-shaped periphery a of the bottom plane b of the connecting member 4a and 6a, respectively. Additionally, the heating panel 2 may be formed with protruded panel connecting members 10 at four sides of the heating panel 2, and each of the protruded panel connecting members 10 may be formed with a straight groove c in which a portion adjacent to the inner fluid pathway 12 is depressed. As such, with the cross-section of the inner fluid pathway formed to have the circular or elliptical shape, the pressure resistance of the heating panel 2 in a central heating system of a high-pressure can be remarkably enhanced.

Figure 4:
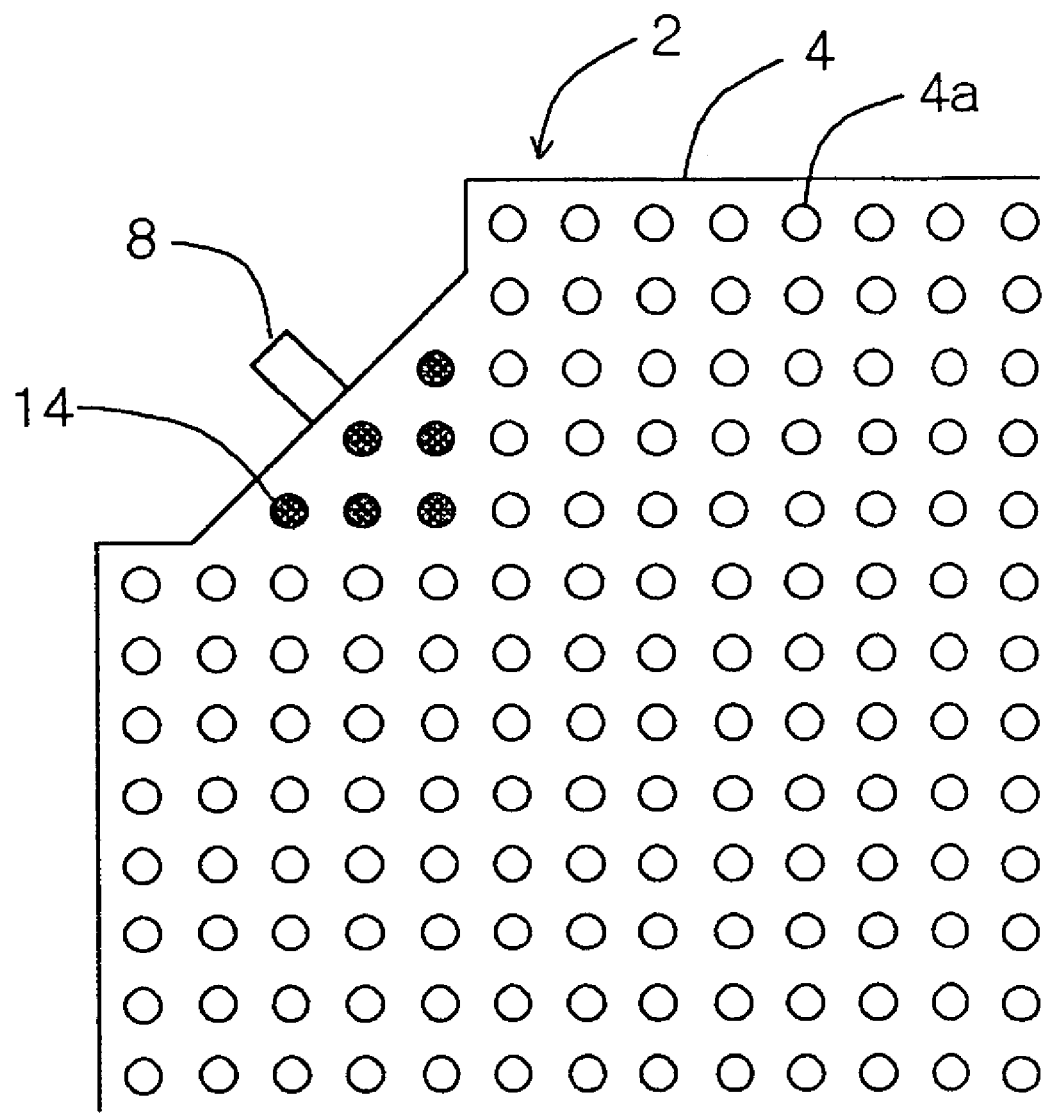
FIG. 4 is a partial plan view illustrating the heating panel having connecting members filled with a resin according to the present invention.

FIG. 4 is a partial plan view illustrating the heating panel with the connecting members filled with a resin according to the present invention. After forming holes of a predetermined size punctured through the connecting members 4a and 6a at portions adjacent to the fluid communication portions of the heating panel 2 using a cylindrical soldering iron having a high temperature, a melted plastic resin 14, such as polypropylene resin, is filled into the punctured holes of the connecting members 4a and 6a, and integrated to the connecting members 4a and 6a by application of a predetermined pressure at the same time, thereby removing the boundary planes and inside air by an amount corresponding to a space filled with the plastic resin 14 in the punctured holes of the connecting members 4a and 6a.

As a result, the boundary plane in the horizontal direction between the upper and lower plates is stopped at the plastic resin 14, and new boundary planes between the plastic resin 14 and the upper and lower plates 4 and 6 are formed in the vertical direction. Accordingly, even though a crack is formed and then progresses along the boundary plane of the horizontal direction between the upper and lower plates, the direction in which the crack progresses is changed such that it progresses along the newly formed boundary planes of the plastic resin 14 in the vertical direction, thereby preventing the crack from spreading. Additionally, the upper and lower plates 4 and 6 are bonded by means of the completely melted plastic resin 14, so that the newly formed boundary planes between the plastic resin 14 and the upper and lower plates 4 and 6 have enhanced boding strength, compared with the conventional heating panel.

Figure 5:
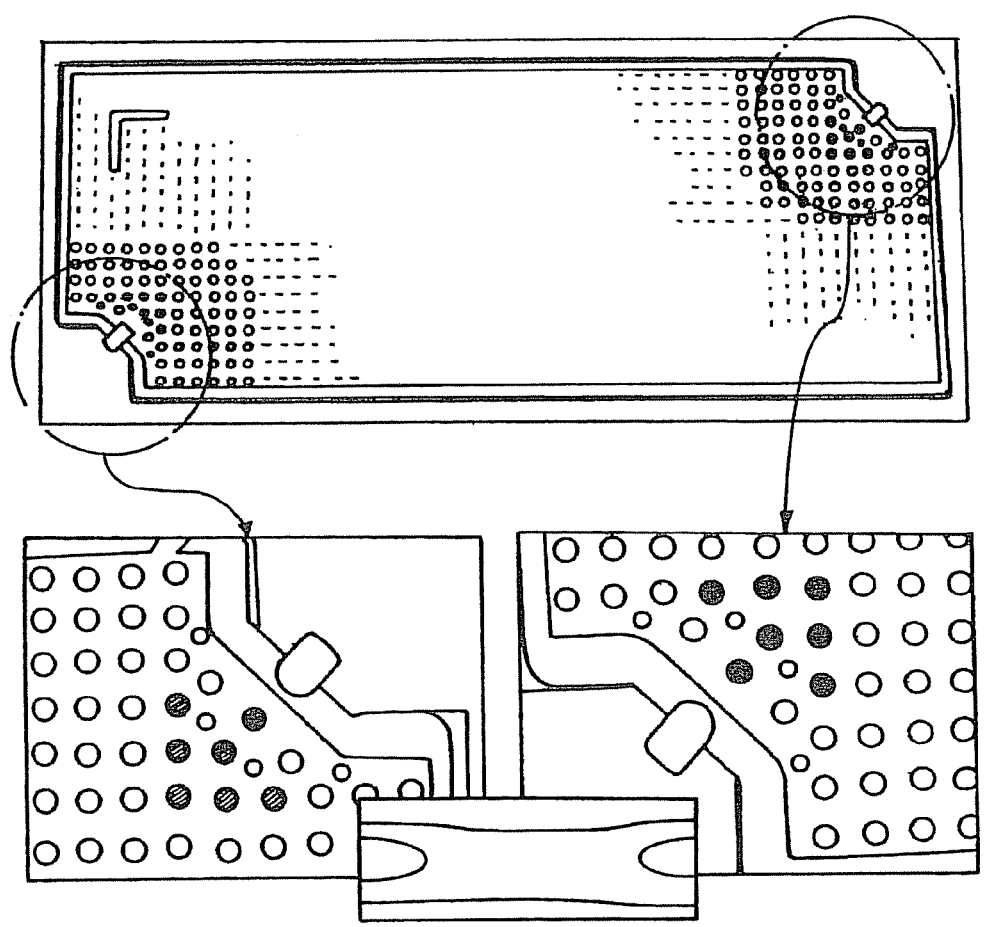
FIG. 5 is a photograph of the heating panel having the connecting members adjacent to an inlet and an outlet of the panel filled with the resin.

FIG. 5 is a photograph of the heating panel according to the present invention, in which the plastic resin 14 is provided to the punctured portions of the connecting members 4a and 6a adjacent to the fluid communication portions corresponding to inlets and outlets of the heating panel 2, which are vulnerable to stresses concentrated thereto.

In the heating panel according to the present invention, although the crack is generated at the connecting members, the direction in which the crack progresses is changed by means of the plastic resin filled in the punctured holes of the connecting members, and the bonding strength is increased in the changed direction of the progressing crack. Test results showed that the pressure resistance of the heating panel is enhanced by about 5 kgf/cm$^2$, compared with the conventional heating panel.

As apparent from the above description, the inlets and outlets of the heating panel subjected to the concentrated stress are reinforced by means of the plastic resin, so that even though the crack is generated, the crack is forced to change in its progressing direction and is prevented from spreading, thereby enhancing the pressure resistance of the heating panel.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. A heating panel, comprising upper and lower plates integrally formed to face each other so as to form an inner fluid pathway in which heating water flows; a plurality of connecting members, each symmetrically extending from the upper and lower plates toward the lower and upper plates, respectively, to form upper and lower connecting members, and connecting the upper and lower plates to each other; the plurality of connecting members forming the inner fluid pathway at an inside surface of the plates; and two fluid communication portions for supplying and discharging the heating water, wherein the upper and lower portions of the inner fluid pathway are rounded where the upper and lower connecting members start to extend from the upper and lower plates, and the connecting members are formed with a groove structure, in which the connecting members are depressed at a circular-shaped periphery of the bottom plane of the connecting members, so that upper and lower portions of the inner fluid pathway form a circular or elliptical shape; and wherein one or more of the plurality of connecting members adjacent to the fluid communication portions are punctured to form holes, the holes being filled with a melted plastic resin, and the melted plastic resin being integrated with the one or more of the plurality of connecting members by pressing.

2. The heating panel according to claim 1, wherein the plastic resin is polypropylene resin or fiber reinforced plastic.

* * * * *